April 14, 1953  C. H. LUHRS  2,635,145
WAVE GUIDE TERMINATION
Filed Dec. 15, 1950
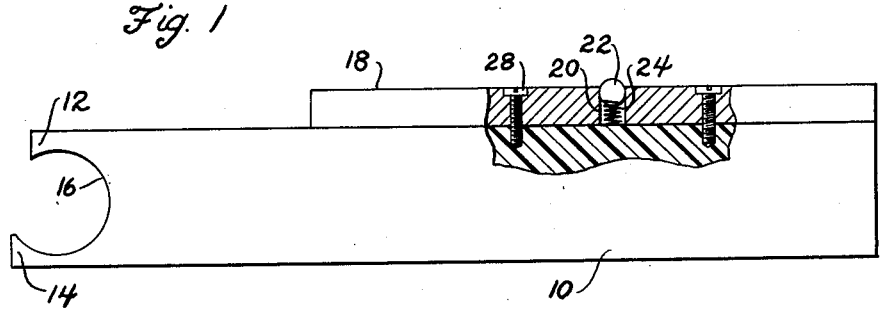
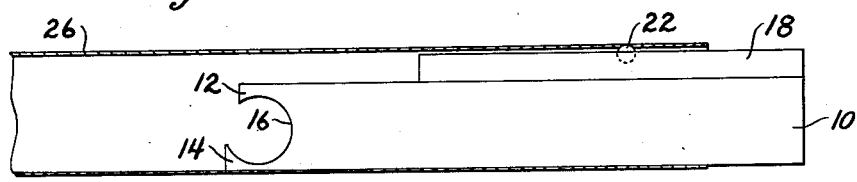
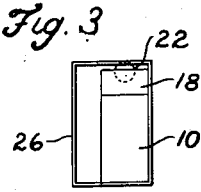
INVENTOR.
Charles H. Luhrs
BY Hoag, Kilburn & Carlson
ATTORNEYS.

Patented Apr. 14, 1953

2,635,145

UNITED STATES PATENT OFFICE 2,635,145

WAVE GUIDE TERMINATION

Charles H. Luhrs, Teaneck, N. J.

Application December 15, 1950, Serial No. 200,923

7 Claims. (Cl. 178—44)

This invention relates to a wave guide termination member.

Such devices are used in connection with the rating or testing of wave guides, for field strength, voltage standing, wave ratio etc. It is well known that a reflection, commonly measured in terms of voltage standing wave ratio, is set up within a wave guide by a variety of causes such for example as changes in the contour or direction of the wave guide, or its cross sectional area. Such reflected waves may also be set up at the interface between the end of a wave guide and atmosphere.

Heretofore terminations, usually tapering in form, have been attached to a wave guide being tested, in permanent fashion, as for example by placing the termination member in a wave guide piece equipped with flanges and securing the flanges of the said piece to the flanges of the wave guide being tested both by screws and by soldering. The termination members heretofore used cannot be successfully employed unless equipped with a flange properly soldered to a flange of the proper type of mating wave guide length to be tested.

Now, it is frequently necessary in the experimental determination of the proper dimensions of microwave devices, such as bends, antennas, rotating joints, directional couplers, etc., to couple and uncouple a termination to equipment under test as many as, say, ten to fifty times a day, it being not uncommon for this sort of thing to go on over a period of months before a fully acceptable design is arrived at; furthermore, some components are of such complexity, e. g., T-junctions and "magic-tees," that several such terminations are required for a single measurement or group of measurements. In this case, the relatively simple operation of securing the two to four screws involved becomes a very bothersome operation.

And the step of soldering flanges to wave guide is even more time consuming and involves a skilled operation. When, as sometimes happens, a technician seeks to save time by using unsoldered flanges an error is likely to be introduced in the result amounting to .05 or greater in the measurement of voltage standing wave ratio.

Accordingly it is an object of my invention to overcome the time consuming operations heretofore incident to the use of termination members for wave guides, and to provide a simple and dependable termination member effective in preventing the creation of reflection of energy or corresponding standing wave from any source located beyond it from the point of testing.

Another object of the invention is to provide a termination member which can be properly coupled to a wave guide by mere insertion therein.

Another object of the invention is to provide a termination member having excellence of match over a wide range of frequency.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which:

Figure 1 is a side elevational view of one embodiment of my invention; and

Figure 2 shows the termination member inserted in a wave guide end in position for facilitating testing of the wave guide piece.

Figure 3 is an end view of the assembly shown in Figure 2.

The embodiment of the invention shown herein comprises a body portion 10, formed of a material which is a poor conductor of electricity. Said body portion is of uniform cross sectional area and preferably conforms generally with the cross sectional shape of the wave guide piece in which it is to be inserted. The front end of the body portion is defined by the marginal projecting portions 12 and 14 respectively, of different length, separated by the concave area 16, which, if the body portion is very narrow, assumes the form of a reentrant slot. Said concavity or slot is preferably defined by an arc of at least 180°, and disposed off center of said body portion, with respect to the longitudinal axis of the body portion, having its center somewhat nearer to the margin of the body from which projection 14 extends than to that portion from which projection 12 extends.

Extending parallel to the body portion 10, but with its forward end substantially behind the forward end of the body portion 10, is a strip 18, which, together with the body portion 10, serves to substantially bridge the internal diameter of the wave guide piece 25 in which the member is inserted. Said member is recessed at 20 to receive and loosely engage therein a ball 22 and spring 24 whereby said termination member is yieldingly and frictionally engaged with the interior surface of the wave guide piece 26 by means of said spring pressed ball 22.

Thus the termination member may be placed in position within the wave guide end by the mere act of inserting it in the wave guide end, and it will retain its position due to the action of said spring pressed ball 22. When it is desired to remove the termination member this is accomplished by merely grasping and withdrawing the member, no substantial force being required to overcome the action of the spring pressed ball 22. The steps of screwing and unscrewing flanges, and soldering and unsoldering are thus entirely eliminated.

In practice I have obtained good results using a body made of plastic, specifically phenol-formaldehyde resin commercially available under the brand name "catalin," and a strip 18, screwed to said body portion as by means of screws 28, made of brass. This termination member having the dimensions shown in Figure 1, inserted 3½ in. into a wave guide has, I have found, a VSWR less than 1.03 over a frequency range of 500 megacycles. Thus specifically I have found it to have a VSWR of less than 1.01 from 9300 mc. to 9900 mc.

As shown in Figure 1 the overall length of the device is 4½ in., its width, exclusive of strip 18, is .694 in., and strip 18 has a width of $\frac{3}{16}$ in. As shown its thickness is ⅜ in., but its thickness may be varied to substantially fill the wave guide or to leave a greater amount of space than is illustrated in Figure 3. The reentrant slot has a diameter of $\frac{17}{32}$ in. and it is located off center by .019 in. The margin 12 extends .382 in. from a plane extending at right angles across the device tangent with the inner end of said reentrant slot, and the margin 14 extends .472 in. from said plane.

I have found that a termination member of the kind disclosed herein provides a good match i. e. is effective in preventing the setting up of a reflected or standing wave from a source located beyond it from the point of testing, over a wide range of frequencies.

My device has the further advantages that it can be readily checked for low VSWR without the difficulties and uncertainties of checking termination members of the prior art; checking of the voltage standing wave ratio caused by the termination can be readily accomplished by moving the device in the wave guide, so that one need never be in doubt as to the magnitude of the mismatch associated with the termination proper; the coupling operation is simple and requires little time. The use of screws or other fastening devices is not required; and its use does not require the application of flanges, although the presence of flanges does not bar its use. Consequently, a considerable saving can be effected in certain types of development and production schedules where the flange soldering operation would ordinarily consume a large portion of expense.

It will thus be seen that there has been provided by this invention a method and apparatus in which the various objects hereinbefore set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. A wave guide termination member which is generally rectangular and adapted for insertion into an end of the guide, and has a concavity in the face of its leading end, said member being of greater width than thickness, and said concavity having a diameter greater than the thickness of the member, and defined by an arc of more than 180°.

2. The device claimed in claim 1 having a marginal portion of its face on one side of said concavity projecting beyond a marginal portion on the opposite side of said concavity.

3. The device claimed in claim 1 in which said concavity is located off center of said face.

4. The device claimed in claim 1 having a cross sectional area substantially less than the cross sectional area of the guide.

5. A wave guide termination member, adapted for insertion in the end of a wave guide to eliminate from the result of field strength tests the standing wave otherwise directed back into the wave guide at the interface between atmosphere and the wave guide end, and having a substantially uniform cross section and a leading face of irregular contour said member comprising a flat substantially rectangular body portion of greater width than thickness, and having a leading end comprising two lateral portions separated by a concavity defined by an arc of at least 180°, said lateral portions projecting different distances from the body portion.

6. The device claimed in claim 5 in which the face of the leading end of said member is characterized by having a circular reentrant slot therein.

7. A wave guide termination member comprising a flat rectangular body having means along one lateral margin for yieldingly engaging with an inner surface of a wave guide said member being of greater width than thickness and having at its leading end a reentrant circular slot defined by an arc of more than 180°.

CHARLES H. LUHRS.

References Cited in the file of this patent

UNITED STATES PATENTS

| Number | Name | Date |
|---|---|---|
| 2,423,396 | Linder | July 1, 1947 |
| 2,430,130 | Linder | Nov. 4, 1947 |
| 2,458,579 | Feldman | Jan. 11, 1949 |
| 2,471,732 | Feenberg | May 31, 1949 |
| 2,543,721 | Collard et al. | Feb. 27, 1951 |
| 2,560,353 | Kerwien | July 10, 1951 |
| 2,567,210 | Hupcey | Sept. 11, 1951 |

OTHER REFERENCES

Publication I, "Attenuator Materials for Microwaves" by Teal, Rigterink and Frosch, published in Electrical Engineering, August 1948.

Principles and Applications of Waveguide Transmission, by G. C. Southworth, Van Nostrand Co., N. Y., copyright 1950.